United States Patent [19]

Elser

[11] 4,030,403

[45] June 21, 1977

[54] POWER STEERING WITH ACCUMULATOR OPERATION

[75] Inventor: Dieter Elser, Bobingen, Germany

[73] Assignee: Zahnradfabrik Friedrichshafen AG, Friedrichshafen, Germany

[22] Filed: Apr. 10, 1975

[21] Appl. No.: 566,829

[52] U.S. Cl. .................................. 91/448; 137/596
[51] Int. Cl.² ..................... F15B 11/08; F15B 13/04
[58] Field of Search ........ 91/448; 137/596, 625.69; 251/48, 251

[56] References Cited

UNITED STATES PATENTS

| | | | |
|---|---|---|---|
| 929,007 | 7/1909 | Phillips | 251/48 |
| 1,850,063 | 3/1932 | Pepper | 251/48 X |
| 2,428,069 | 9/1947 | Forker, Jr. | 91/448 |
| 2,882,867 | 4/1959 | Thompson | 137/609 |
| 2,968,316 | 1/1961 | Schultz | 137/596 |
| 3,101,838 | 8/1963 | Boulay | 251/48 X |
| 3,358,711 | 12/1967 | Pruvot | 137/596 X |
| 3,492,816 | 2/1970 | Adams | 91/448 X |

FOREIGN PATENTS OR APPLICATIONS 2,131,276  12/1972  Germany

*Primary Examiner*—Irwin C. Cohen
*Attorney, Agent, or Firm*—Zalkind & Shuster

[57] ABSTRACT

A steering spindle operated valve arrangement is used to control flow to and from an accumulator pressure source to a servo motor, with an upstream valve means in series with a flow control piston valve to ensure against leakage during times of straight ahead steering when no pressure is required. This is of importance in any vehicle accumulator system to guard against insufficiency of pressure due to leakage, especially where accumulator pressure is used for functions other than steering boost, e.g., brakes, and accessories. The series valve means takes the form of one or more conical valves which are spring and pressure biased to closed position but mechanically opened by manual force upon steering spindle operation. The arrangement is such that the upstream valve means opens prior to opening of the piston valve for pressure feed to a servo motor.

6 Claims, 4 Drawing Figures

POWER STEERING WITH ACCUMULATOR OPERATION

Briefly, the invention comprises a flow control piston valve having piston heads for permitting or cutting off flow from respective feed and exhaust grooves in a piston valve sleeve wherein a centrally located pin passing through or inserted into the piston valve is actuated manually by the steering spindle of the vehicle. In one modification of the invention, a conical head shut off valve is arranged in fluid flow series with the pressure flow from an accumulator and the pressure feed passages to the piston valve. The conical valve is constructed and arranged so that a differential pressure bias exists tending to hold the conical valve tightly closed. A conventional spring effects closure of the conical valve after it has been opened.

A mechanical arrangement connects the piston valve actuating pin with the conical valve so that upon shifting of the piston valve the conical valve is opened by manual force. Such arrangement comprises a connection via a driving mechanism and a return spring in the form of a torsion rod which centers the piston valve after a steering function and automatically permits closure of the conical valve. A second modification is essentially as just described except that a respective conical shutoff valve is used for each pressure feed passage connecting to the piston valve, thereby decreasing risk of leakage.

Reference is made herein to the German published application 2,131,276, which shows a series valve arrangement for preventing accumulator pressure leakage. In such instance however, the opening of the leakage preventing valves is not effected by manual force as in the present invention and therefore, a more complex and less reliable arrangement results in contrast to the disclosure herein.

The invention will now be described in conjunction with the appended drawing in which.

Figure 1:
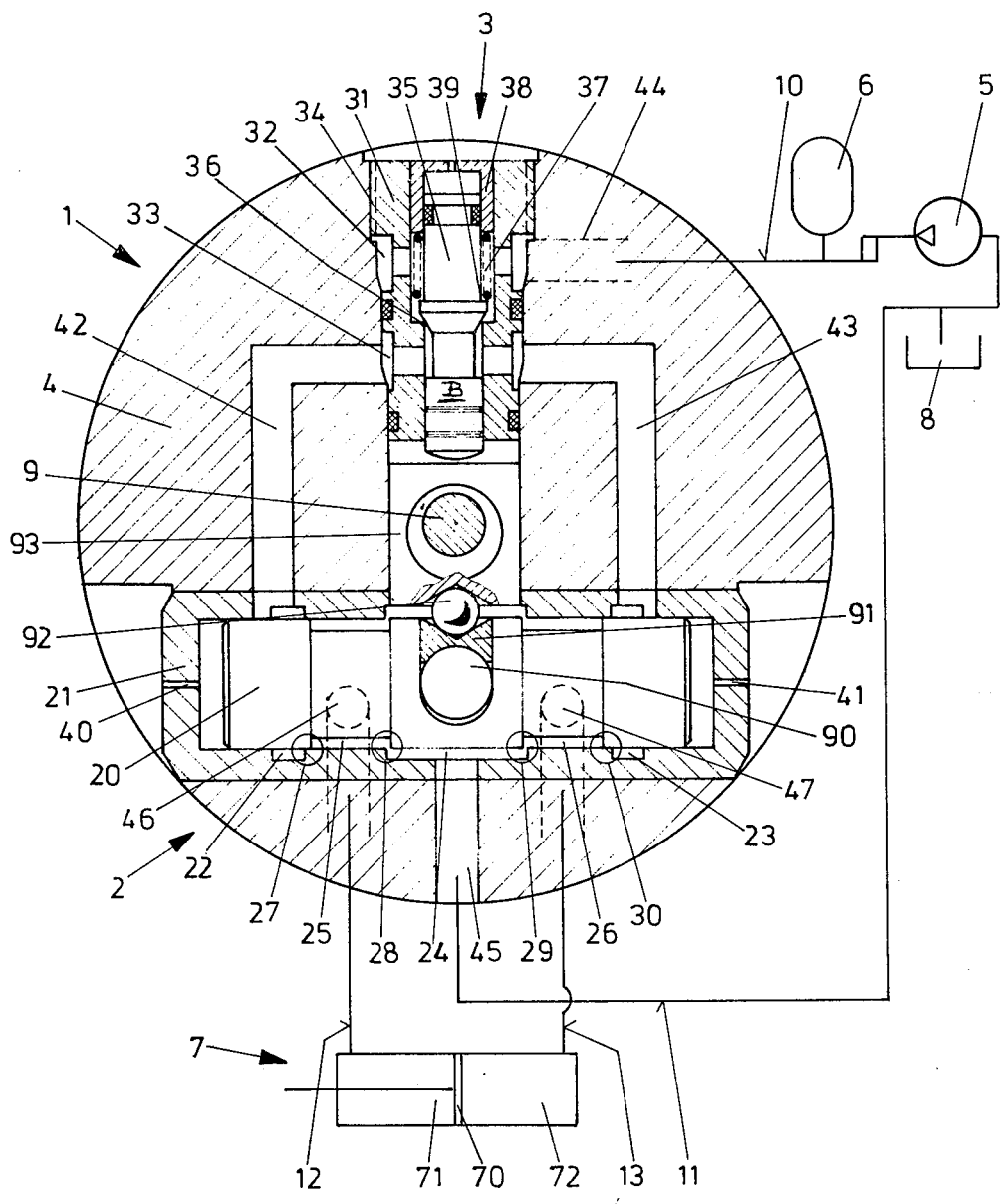
FIG. 1 is a radial cross section of a valve housing showing the essential components of the invention.

Referring to FIG. 1, the general assembly 1 of the housing is illustrated comprising a control valve 2 in the form of a piston valve 20 and a series valve 3 in the form of a conical valve 35, i.e., having a conical valve head. The valves are in a housing 4 and control flow from a pump 5 utilized to pressurize an accumulator 6 for pressurizing or exhausting a servo motor 7 wherein the general system is completed as by a sump or tank 8. Thus, accumulator 6 feeds via line 10 and housing passage 44 to an annular groove 32 surrounding conical valve 3. The conical valve slides within a valve sleeve 31 which may be adjustably threaded at 34 in housing 4.

The conical valve is biased closed by a helical spring 37 acting against a fixed backing cup 38, the spring acting against a radial shoulder 39 of the conical valve head which valve head seats against valve seat 36 machined into the valve sleeve 31. The backing cup 38 will be seen to be provided with a small bore at its top for cushioning purposes to prevent too violent closure of the valve.

From the above, it will be apparent that pressure from the accumulator acting on the enlarged upper area of the conical valve head effected by shoulder 39, via line 10 and groove 32 and bores in sleeve 31, will maintain a pressure closing force. The conical valve head extends downwardly and has a button B slidably guided in sleeve 31 and having a necked down portion surrounded by a groove 33 of the sleeve 31 which connects with housing feed passages 42 and 43 communicating with respective pressure feed grooves 22 and 23 in a valve sleeve 21 of piston valve 20 slidably shiftable in valve sleeve 21.

Opposed piston heads of valve piston 20, as shown, act in respective pressure chambers of sleeve 21, the ends of which sleeve are provided with respective damping bores 40 and 41 for cushioning effect. The valve piston is symmetrically provided with pressure feed grooves 25 and 26 having respective edges 27 and 30 effecting flow control gaps when the valve piston is shifted, and a central return groove 24 is provided in the valve sleeve.

Shifting piston valve 20 from the neutral or straight ahead steering position shown in FIG. 1 to the left or right will effect pressurizing via housing passages 46 or 47 and feed lines 12 or 13, respectively, of a respective chamber 71 or 72 of servo motor 7 for actuating piston 70 to right or left, respectively. The opposite chamber, 71 or 72, as the case may be, then exhausts via a gap at an edge 28 or 29 of return grooves 24, the other gap connecting to the chamber to be pressurized being then closed as will be readily understood from the symmetry of the arrangement. Thus, exhaust fluid will pass through the connections 12 or 13 to the return groove 24 which connects with housing passage 45 for connection with return line 11 to the tank 8.

Actuation of the piston valves is effected by a pin 90 which passes into the central portion of the symmetrically constructed piston valve body and which pin is actuated left or right for steering in the respective directions by the steering spindle (not shown). Resting on pin 90 is a conforming camming device or wedge member 91 arcuate on one surface to match the pin circularity and having a conical cavity at its opposite surface in which rests a ball 92 in turn supporting a slide block 93, the ball being accommodated in a conical cavity at the bottom of the block, as shown.

Accordingly, it will be appreciated that shifting of the piston valve 20 will effect a rise by virtue of the camming action of ball 92 against the sloping walls of the conical cavity in the bottom of slide block 93 and the movement of the block will abut the button B of conical valve 35 to open that valve by manual force exerted at the steering spindle. However, it is important to note that the dimensioning of the components is such that valve 35 is opened to permit pressure feed to reach the piston valve 20 before that valve opens a feed gap at edge 27 or 30 while simultaneously closing the corresponding gap at edge 28 or 29 against fluid return.

Figure 1A:
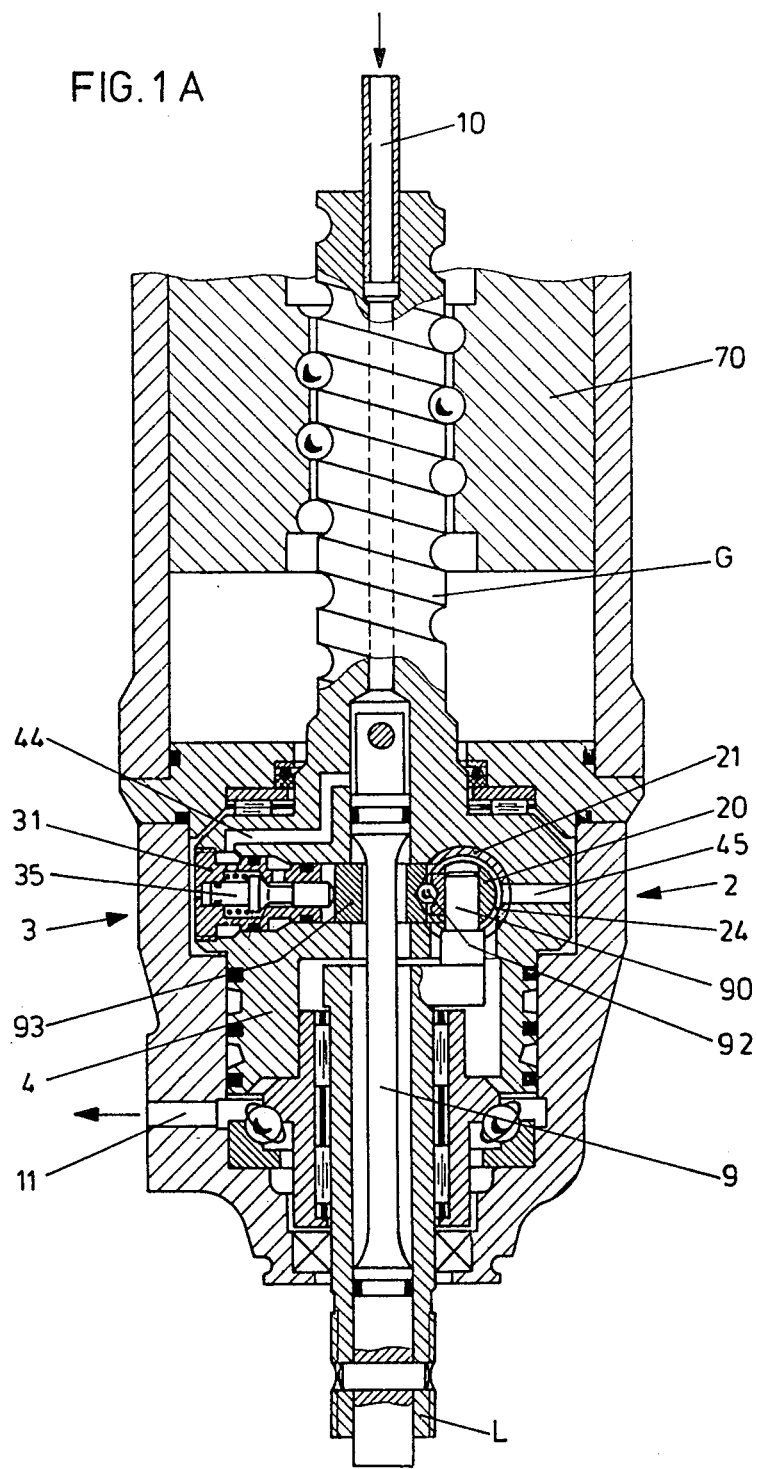
FIG. 1A is a longitudinal cross section of the form of the invention shown in FIG. 1.

For purposes of compactness and rapidity of operation, a torsion rod 9 is utilized for return of the piston valve to the neutral position. FIG. 1A illustrates the arrangement of the torsion rod 9, the drawing showing reference characters all as found on FIG. 1 and no further explanation therefore being required except for a showing of the servo motor piston 70 threadedly co-acting with the spindle worm G rotated through the steering spindle connection L. Thus, the torsion rod is pinned to the connection L at the one end and to the worm at the other end so that a torsion stress is effected as the collar surrounding the torsion rod is rotated carrying pin 90 to actuate valve 20. Thus, when pin 90 shifts to the left or the right it stresses rod 9 torsionally and, upon release of pin 90 from manual force, torsion rod 9 returns to its normal unstressed condition and thus returns pin 90 to central position whereat slide block 93 is returned to neutral position as by spring 37, the conical valve 35 closing. Torsion rod 9 may advantageously be incorporated in a compact design by passing through an oversized hole, as shown, in slide block 93 so that the slide block can ride up and down without being impeded by the torsion rod.

From all of the preceding description and the complete symmetry of the valving and passages, it will be obvious that flow from the accumulator must first pass the conical valve in order to reach the piston valve and therefore leakage is minimized at the piston valve by virtue of cut off of flow at the conical valve. In straight ahead steering there is no feed to either end of the servo motor 7, the chambers thereof being cut off from pressure feed at piston valve edges 27 and 30. At the same time both chambers of the servo motor are open to exhaust at the gapped edges 28 and 29. It will be obvious that shifting of the piston valve, for example, to the left will close gap 28 and open gap 27 thereby pressurizing chamber 71 of the servo motor, the piston 70 thereof then going to the right. At the same time, chamber 72 maintains exhaust communication. Conversely, shifting the piston valve 20 to the right effects exactly the reverse operation resulting in shifting of the piston 70 to the left.

Figure 2:
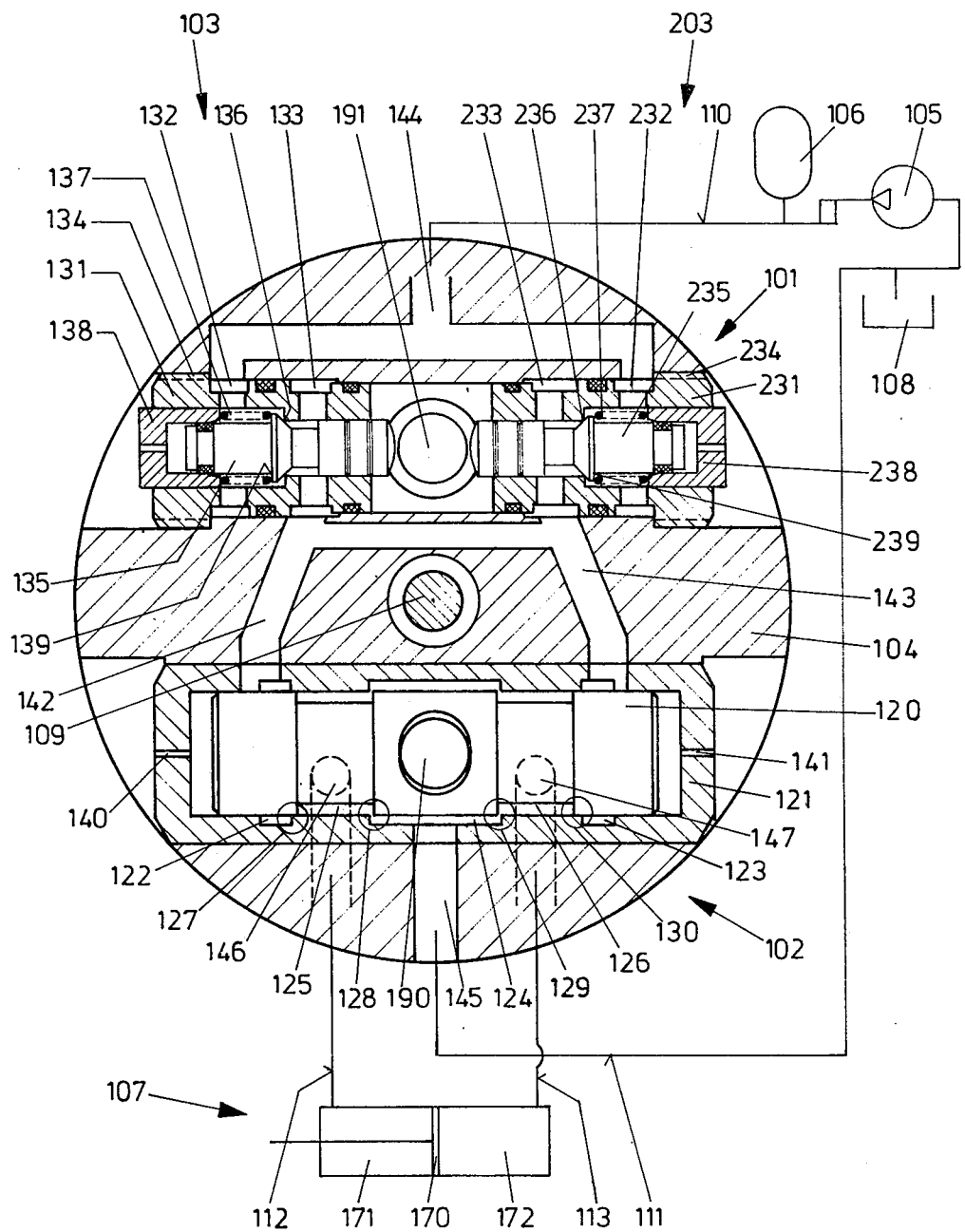
FIG. 2 is a radial cross section of a valve housing showing a modified version of the invention.

Referring now to FIG. 2. the operation and components are fore the most part the same as just described except that in the valve arrangement 101 two cut off valves 103 and 203 of the conical head type are utilized combined in housing 104 and controlling fluid to the control valve 102 comprising the valve piston 120 shiftable in a valve sleeve 121 having damping bores 140 and 141.

Pressure feed grooves 122 and 123 and exhaust groove 124 are provided in valve sleeve 121. Valve piston 120 has grooves 125 and 126 for feed inlet and edges 127 and 130 for feed control with return groove 124 and edges 128 and 129 whereby control of exhaust is effected, all as heretofore described in conjunction with FIG. 1.

The conical valves 103 and 203 are essentially the same as the single conical valve 3 of FIG. 1 comprising respective valve sleeves 131 and 231 mounted by adjustable threading 134 and 234, respectively, in housing 104. Conical valve 103 has annular grooves 132 and 133 in valve sleeve 131 and a conical valve head biased by spring 137 against valve seat 136 backed by the backing member 138 having a damping bore, as shown. Conical valve 135 also has the radial flange 139 effecting an enlarged area to be acted on by accumulator pressure for biasing the valve to closed position.

The conical valve 203 is in all respects identical to conical valve 103 having annular grooves 232 and 233 in valve sleeve 231 and conical valve head 235 biased by spring 237 against seat 236, the spring being backed by the backing member 238 having a damping bore, as shown. Conical valve head 235 has a radial flange 239 enlarging the area subjected to accumulator pressure for effecting bias against the valve seat.

Pressure feed from pump 105 is fed to accumulator 106 and thence via line 110 to housing passage 144 whence it brances to grooves 132 and 232 of the respective conical valves and is cut off pending opening of either valve. The housing 104 also contains the passages 142 and 143 leading to respective piston valve heads from the conical valve outlet grooves, respectively, 133 and 233. The piston valve is shown in neutral position and pressure feed to servo motor 107 is cut off at the closed edges 127 and 130 leading to respective feed passages 146 and 147 and respective lines 112 and 113. The chambers 171 and 172 of the servo motor 107 are connected via open edges 128 and 129 through lines 112 and 113 to the housing exhaust passage 145 and thence via line 111 to the tank 108. The arrangement of the components just described is entirely symmetrical in housing 104.

The piston valve 120 is actuated via pin 190 by the steering spindle (not shown). The pin 191 inserted through an oversize housing bore for freedom of movement can actuate either of the conical valve and is connected for operation to pin 190 for movement in either direction by the steering spindle steering effort. Thus, pins 190 and 191 will be understood to be carried at the ends of a lever connected with a torsion rod 109 in such a manner that turning of the steering spindle will move the piston valve in one direction while moving one of the conical valves in the other direction at the same time putting torque stress on the torsion rod. Accordingly, if it be assumed that the valve piston 120 has been moved to the right then the conical valve 135 has been opened before and flow takes place via grooves 132 and 133, to passage 142 and 143 to respective grooves 122 and 123. Accordingly, the gap at edge 130 opens up to permit pressure feed via groove 126 and line 113 to chamber 172, while at the same time the gap at edge 129 closes to block any loss of pressure feed to return passage 145. At the same time, chamber 171 of the servo motor remains connected to the return passage. Piston 170 will then move to the left. The reverse operation takes place if the piston valve is moved to the left, in which case conical valve 235 is opened while 135 remains closed, chamber 171 then being pressurized and chamber 172 remaining open to exhaust.

Again it will be noted that either conical valve opens before a pressure feed gap of the piston valve 120 opens due to overlap of the edges of the piston valve.

Figure 2A:
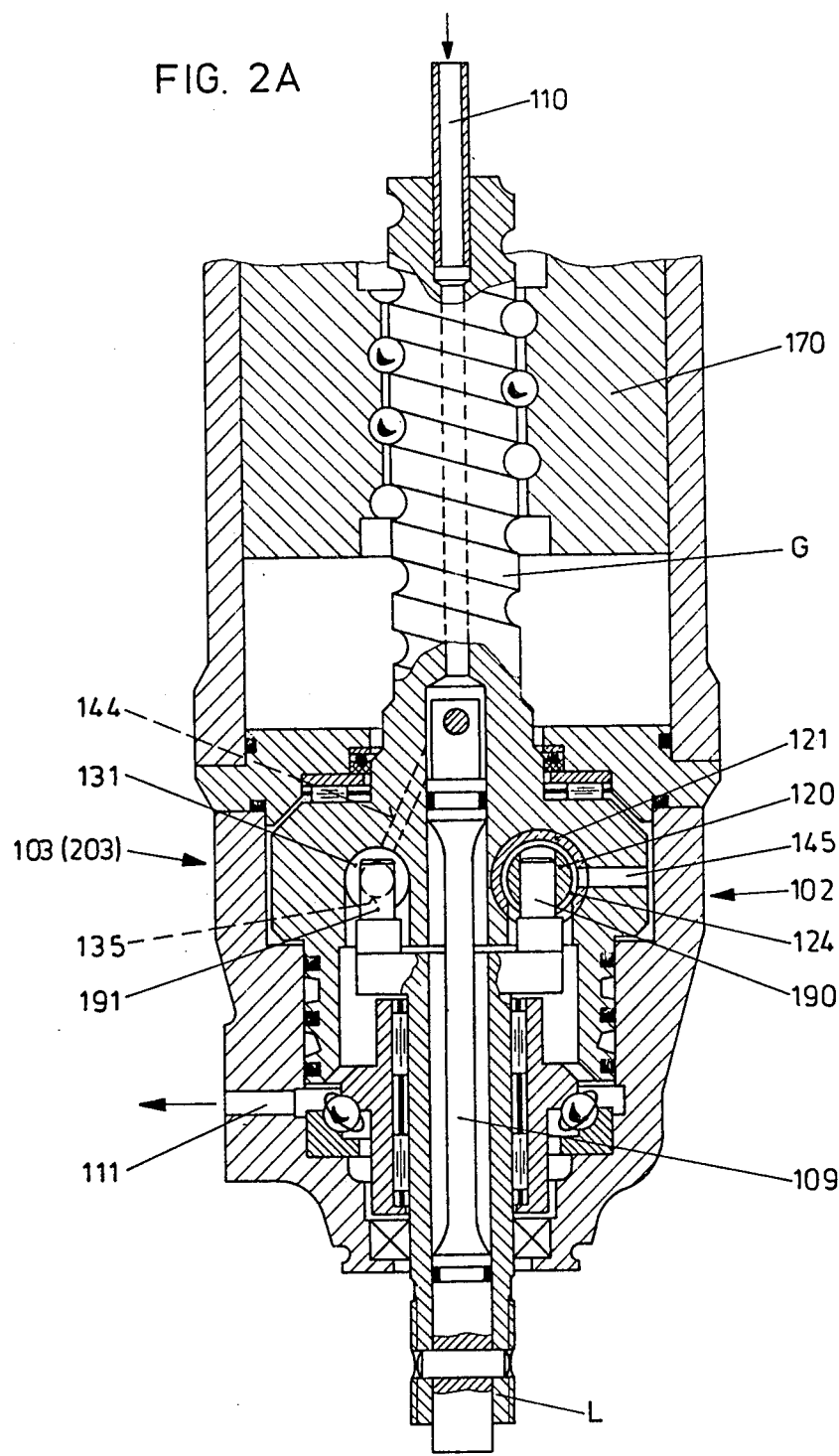
FIG. 2A is a longitudinal cross section of the form of the invention shown in FIG. 2.

FIG. 2A carries forward the reference characters of FIG. 2 and will be seen to coincide closely with FIG. 1A in that the servo motor piston 170 co-acting with worm G is shown operated through torsion rod 109 upon turning of spindle connection L which rotates the collar surrounding the torsion rod so that the pins 190 and 191 carried thereon operate their respective valves.

What is claimed is:

1. A power steering system comprising:
a double acting servomotor and an accumulator;
a steering control piston valve (20) having a pair of piston heads;
a housing inlet and outlet ports and passages for connection to said servomotor and accumulator and having a bore in which said piston valve is shiftable;
a manually operable steering actuating means (90) engaging said piston valve for bidirectional movement to pressurize said servomotor selectively for corresponding bidirectional steering responsive to operator control;

said housing having pressure feed (22, 23) and exhaust grooves (24) coacting with respective piston heads to control flow through said passages and ports wherein a neutral position of said piston valve cuts off pressure feed to said double acting servomotor while effecting continuous connection for exhasut flow therefrom;

said passages having pressure feed passage means (42, 43) for flow from said accumulator to said pressure feed grooves;

valve means (3) in said passage means including bias means (37) biasing said valve means to normally cut off flow through said passage means;

actuating means for said valve means (91, 92, 93) engaging said piston valve and disposed to be operated only by manual force upon shift of said piston valve by said manually operable actuating means (90) to open said valve means when said piston valve is actuated to effect pressure feed to said servomotor;

said valve means comprising a conical valve head and a seat therefor and means biasing said conical valve head to seated position responsive to accumulator pressure;

a sleeve in which said valve head is slidable;

a portion of said valve means having reciprocal and sealed guidance in a portion of said sleeve;

said sleeve portion being closed except for a damping bore therein;

said pressure feed passage means comprising annular grooves on said sleeve upstream and downstream of said valve seat.

2. A Power Steering System as set forth in claim 1, wherein said pressure feed passage means comprises respective passages for conducting pressure feed to each said piston head;

said valve means comprising a conical valve head and seat therefor in each said passage.

3. A power steering system comprising:

a double acting servomotor and an accumulator;

a steering control piston valve (20) having a pair of piston heads;

a housing having inlet and outlet ports and passages for connection to said servomotor and accumulator and having a bore in which said piston valve is shiftable;

a manually operable steering actuating means (90) engaging said piston valve for bidirectional movement to pressurize said servomotor selectively for corresponding bidirectional steering responsive to operator control;

said housing having pressure feed (22, 23) and exhaust grooves (24) coacting with respective piston heads to control flow through said passage and ports wherein a neutral position of said piston valve cuts off pressure feed to said double acting servomotor while effecting continuous connection for exhaust flow therefrom;

said passages having pressure feed passage means (42, 43) for flow from said accumulator to said pressure feed grooves;

valve means (3) in said passage means including bias means (37) biasing said valve means to normally cut off flow through said passage means;

actuating means for said valve means (91, 92, 93) engaging said piston valve and disposed to be operated only by manual force upon shift of said piston valve by said manually operable actuating means (90) to open said valve means when said piston valve is actuated to effect pressure feed to said servomotor;

wherein said manually operable actuating means comprises a pin (90) extending into said piston valve adapted to be motivated axially of said piston valve for shifting thereof by manual force on a steering spindle;

said actuating means for said valve means comprising a slide block means (93) constructed and arranged to abut and open said valve means and a camming device (91, 92) intermediate said pin (90) and said slide block means and carried by said piston valve for driving said slide block when said piston valve means is shifted so as to open said valve means.

4. A power steering system comprising:

a double acting servomotor and an accumulator;

a steering control piston valve (20) having a pair of piston heads;

a housing having inlet and outlet ports and passages for connection to said servomotor and accumulator and having a bore in which said piston valve is shiftable;

a manually operable steering actuating means (90) engaging said piston valve for bidirectional movement to pressurize said servomotor selectively for corresponding bidirectional steering responsive to operator control;

said housing having pressure feed (22, 23) and exhaust grooves (24) coacting with respective piston heads to control flow through said passages and ports wherein a neutral position of said piston valve cuts off pressure feed to said double acting servomotor while effecting continuous connection for exhaust flow therefrom;

said passages having pressure feed passage means (42, 43) for flow from said accumulator to said pressure feed grooves;

valve means (3) in said passage means including bias means (37) biasing said valve means to normally cut off flow through said passage means;

actuating means for said valve means (91, 92, 93) engaging said piston valve and disposed to be operated only by manual force upon shift of said piston valve by said manually operable actuating means (90) to open said valve means when said piston valve is actuated to effect pressure feed to said servomotor;

said housing having a bore and carrying a slide block slidable in said bore;

a camming device (91) comprising a member carried in said piston valve and having means effecting a camming surface;

a ball carried intermediate said slide block and said camming device whereby shifting of said piston valve effects thrust on said slide block through said ball;

a pin (90) comprised in said manually operable actuating means and protruding into said piston valve;

said camming device protruding into said piston valve and resting on said pin.

5. A power steering system comprising:

a double acting servomotor and an accumulator;

a steering control piston valve (20) having a pair of piston heads;

a housing having inlet and outlet ports and passages for connection to said servomotor and accumulator and having a bore in which said piston valve is shiftable;

a manually operable steering actuating means (90) engaging said piston valve for bidirectional movement to pressurize said servomotor selectively for corresponding bidirectional steering responsive to operator control;

said housing having pressure feed (22, 23) and exhaust grooves (24) coacting with respective piston heads to control flow through said passages and ports wherein a neutral position of said piston cuts off pressure feed to said double acting servomotor while effecting continuous connection for exhaust flow therefrom;

said passages having pressure feed passage means (42, 43) for flow from said accumulator to said pressure feed grooves;

valve means (3) in said passage means including bias means (37) biasing said valve means to normally cut off flow through said passage means;

actuating means for said valve means (91, 92, 93) engaging said piston valve and disposed to be operated only by manual force upon shift of said piston valve by said manually operable actuating means (90) to open said valve means when said piston valve is actuated to effect pressure feed to said servomotor;

wherein said manually operable actuating means comprises a pin extending into said piston valve to be motivated axially of said piston valve for shifting thereof by manual force on a steering spindle;

said actuating means for said valve means comprising a slide block constructed and arranged to abut and open said valve means;

a camming device intermediate said pin and said slide block for driving said slide block when said piston valve is shifted so as to open said valve means;

and resilient means for biasing said valve piston to a neutral straight-ahead position;

said resilient means comprising a torque rod extending through an oversized aperture in said slide block.

6. A power steering system comprising:

a double acting servomotor and an accumulator;

a steering control piston valve (20) having a pair of piston heads;

a housing having inlet and outlet ports and passages for connection to said servomotor and accumulator and having a bore in which said piston valve is shiftable;

a manually operable steering actuating means (90) engaging said piston valve for bidirectional movement to pressurize said servomotor selectively for corresponding bidirectional steering responsive to operator control;

said housing having pressure feed (22, 23) and exhaust grooves (24) coacting with respective piston heads to control flow through said passages and ports wherein a neutral position of said piston valve cuts off pressure feed to said double acting servomotor while effecting continuous connection for exhaust flow therefrom;

said passages having pressure feed passage means (42), 43) for flow from said accumulator to said pressure feed grooves;

valve means (3) in said passage means including bias means (37) biasing said valve means to normally cut off flow through said passage means;

actuating means for said valve means (91, 92, 93) engaging said piston valve and disposed to be operated only by manual force upon shift of said piston valve by said manually operable actuating means (90) to open said valve means when said piston valve is actuated to effect pressure feed to said servomotor;

wherein said manually operable actuating means comprises a pin (90) extending into said piston valve adapted to be motivated axially of said piston valve for shifting thereof by manual force on a steering spindle;

said actuating means for said valve means comprising a slide block means (93) constructed and arranged to abut and open said valve means and a camming device (91, 92) intermediate said pin (90) and said slide block and carried by said piston valve for driving said slide block when said piston valve is shifted so as to open said valve means;

said pressure feed passage means comprising a pair of spaced passages and said housing having a bore intermediate said latter passages with said slide block slidably disposed in said bore.

* * * * *